(12) United States Patent
Elhassen et al.

(10) Patent No.: US 10,341,524 B2
(45) Date of Patent: Jul. 2, 2019

(54) SYSTEM AND METHOD OF PROCESSING DOCUMENTS TO PROVIDE DOCUMENT HISTORY AND COMPLIANCE CONTROL

(71) Applicant: Xerox Corporation, Norwalk, CT (US)

(72) Inventors: Adam Elhassen, Victor, NY (US); Jason Slack, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 69 days.

(21) Appl. No.: 15/492,538

(22) Filed: Apr. 20, 2017

(65) Prior Publication Data

US 2018/0309898 A1 Oct. 25, 2018

(51) Int. Cl.
*G06F 3/12* (2006.01)
*H04N 1/00* (2006.01)
*H04N 1/32* (2006.01)
*H04N 1/44* (2006.01)
*G06F 16/93* (2019.01)
*G06K 15/00* (2006.01)
*G08B 21/18* (2006.01)
*G06K 9/00* (2006.01)
*G06K 9/18* (2006.01)

(52) U.S. Cl.
CPC ....... *H04N 1/32144* (2013.01); *G06F 3/1222* (2013.01); *G06F 3/1238* (2013.01); *G06F 3/1253* (2013.01); *G06F 3/1273* (2013.01); *G06F 3/1286* (2013.01); *G06F 16/93* (2019.01); *G06K 15/4095* (2013.01); *G08B 21/18* (2013.01); *H04N 1/00222* (2013.01); *H04N 1/00236* (2013.01); *H04N 1/00244* (2013.01); *H04N 1/00323* (2013.01); *H04N 1/00342* (2013.01); *H04N 1/00408* (2013.01); *H04N 1/00482* (2013.01); *H04N 1/32138* (2013.01); *H04N 1/444* (2013.01); *H04N 1/4413* (2013.01); *H04N 1/4433* (2013.01); *G06K 9/00442* (2013.01); *G06K 9/18* (2013.01); *H04N 2201/0094* (2013.01); *H04N 2201/3212* (2013.01)

(58) Field of Classification Search
None
See application file for complete search history.

(56) References Cited

U.S. PATENT DOCUMENTS

| | | | |
|---|---|---|---|
| 7,110,541 B1 | 9/2006 | Lunt et al. | |
| 7,495,792 B2 | 2/2009 | Snowdon et al. | |
| 7,588,192 B2 | 9/2009 | Byström et al. | |
| 7,590,934 B2 | 9/2009 | Hubert et al. | |
| 7,599,929 B2 | 10/2009 | Ueda | |
| 7,958,147 B1 * | 6/2011 | Turner | G06F 21/604 707/694 |
| 7,969,619 B2 * | 6/2011 | Ohta | G06F 16/93 358/403 |
| 8,228,558 B2 * | 7/2012 | Kai | G06F 3/1222 358/1.9 |
| 8,266,526 B2 | 9/2012 | Masuda et al. | |

(Continued)

*Primary Examiner* — Scott A Rogers
(74) *Attorney, Agent, or Firm* — Fay Sharpe LLP

(57) ABSTRACT

This disclosure provides a document management method and system to monitor activity associated with a processed document according to an exemplary embodiment of the disclosure, the document management system is configured to apply security controls to a document and provide a full organizational audit history of documents processed.

20 Claims, 20 Drawing Sheets

(56) References Cited

U.S. PATENT DOCUMENTS

| | | | |
|---|---|---|---|
| 8,515,923 | B2 | 8/2013 | Wenn et al. |
| 8,699,075 | B2 | 4/2014 | Privault et al. |
| 8,953,190 | B2 | 2/2015 | Poysa et al. |
| 9,250,834 | B2 | 2/2016 | Grodsky et al. |
| 9,716,711 | B2 * | 7/2017 | Porter .................. G06F 21/645 |
| 2002/0111960 | A1 * | 8/2002 | Irons ................. G06F 17/30011 |
| 2006/0104682 | A1 * | 5/2006 | Shimazawa ............ G03G 21/04 399/366 |
| 2007/0106932 | A1 * | 5/2007 | Coar ................. G06F 17/30011 715/234 |
| 2007/0133063 | A1 | 6/2007 | Harrington |
| 2007/0188811 | A1 * | 8/2007 | Terada ............... H04N 1/32138 358/2.1 |
| 2009/0314836 | A1 * | 12/2009 | Kothari .................. G06Q 10/08 235/385 |
| 2010/0238506 | A1 * | 9/2010 | Murakami ............. G06F 16/93 358/1.16 |
| 2010/0257141 | A1 | 10/2010 | Monet et al. |
| 2011/0102826 | A1 * | 5/2011 | Fujiwara ............ H04N 1/00222 358/1.13 |
| 2013/0077857 | A1 | 3/2013 | Privault et al. |
| 2014/0043646 | A1 | 2/2014 | Levine et al. |
| 2014/0203072 | A1 | 7/2014 | Jackson et al. |
| 2014/0320874 | A1 | 10/2014 | Tredoux et al. |
| 2015/0100389 | A1 | 4/2015 | DeRoller et al. |
| 2015/0324331 | A1 | 11/2015 | Tredoux et al. |
| 2016/0012324 | A1 | 1/2016 | Eschbach et al. |
| 2017/0046604 | A1 | 2/2017 | Kay et al. |

\* cited by examiner

| | | | | | Home | User1 | Log Out |
|---|---|---|---|---|---|

Content Security

Results
Document Log
User Security
End Users
User Security Levels
User Security Items
LDAP Connections
Document Security
Document Security Levels
Document Security Items
Document Log Repositories
Agents
Agent Types
Agent Features

Agent Features

(Enable) (Disable)

Drag a column header and drop it here to group by that column

| | Agent Features ▲ | Feature Type ▼ | Enabled ▼ | No. Associate... ▼ | Date Last Edit... ▼ | Last Edited By ▼ |
|---|---|---|---|---|---|---|
| ⊙ Edit | Document Content Evaluation | Monitoring | Yes | 4 | 12-Jan-2017 13:07 | |
| ⊙ Edit | Document Content Storage | Logging | Yes | - | 12-Jan-2017 15:24 | User 2 |
| ⊙ Edit | Document Logging | Logging | Yes | - | 12-Jan-2017 13:07 | |
| ⊙ Edit | TITUS | Monitoring | Yes | 4 | 12-Jan-2017 13:07 | |
| ⊙ Edit | Document Secure Marking | Marking | Yes | - | | |

| Content Security | | | | | | Home | User1 | Log Out |
|---|---|---|---|---|---|---|
| ⊕ New  ◯ Enable  ◯ Disable  ⊗ Delete | | | | | | |
| Drag a column header and drop it here to group by that column | | | | | | |
| | Priority Order ▾ | Default ▾ | Enabled ▾ | No. Associate... ▾ | Date Last Edit... ▾ | Last Edited By ▾ |
| ⊙ Edit Documents | 1 | No | Yes | 1 | 12-Jan-2017 13:57 | User 3 |
| ⊙ Edit Documents | 2 | No | Yes | 1 | 13-Jan-2017 10:52 | User 2 |
| ⊙ Edit Documents | 3 | No | Yes | 1 | 13-Jan-2017 10:51 | User 2 |
| ⊙ Edit Documents | 4 | No | Yes | 1 | 13-Jan-2017 10:52 | User 2 |
| ⊙ Edit Documents | 5 | Yes | Yes | 0 | 18-Jan-2017 12:19 | User 1 |

Results
Document Log
User Security
End Users
User Security Levels
User Security Items
LDAP Connections
Document Security
Document Security Levels
Document Security Items
Document Log Repositories
Agents

Content Security

⌂ Home | ☻ User 1 | ↑ Log Out

Results
Document Log
User Security
End Users
User Security Levels
User Security Items
LDAP Connections
Document Security
Document Security Levels
Document Security Items
Document Log Repositories
Agents
Agent Types
Agent Features
Device Security
Devices Devices
[⊕ New] [Enable] [Disable] [⊘ Delete]
Drag a column header and drop it here to group by that column

| DNS N... | IP Add... | Device... | Enabled | Xerox... | Xerox... |
|---|---|---|---|---|---|
| [⊘ Edit] | 13.121.187.1... | Printer | Yes | Yes | Yes |
| [⊘ Edit] | 13.249.147.75... | Printer | Yes | Yes | Yes |

FIG. 14

Device:
Identity

Enabled ☒ (Disabled device stop all logging and
monitoring.)
DNS Name
IP Address (IPv4)  13.121.187.102
Device Type  ☐ Printer

Status

Communication Status  Ready
Last Communication  13-Jan-2017 09:40

SNMP Settings

SNMP Version  [SNMP v1/v2 ▼]
GET Community Name  [public]
SET Community Name  [private]

When the printer is discovered, this will be used as the initial value.

Security

Admin User Name  [admin]
Admin Password  [*******]

[Save] [Apply] [Cancel]

Printer Application

Registration Status  ⊙ Registered  [Re-Register]

Copy Agent

Enabled  Yes       Secure Marking Enabled? ☐
Agent Status  Running
Last Communication 3-Jan-2017 09:51

[Agent Details]

Scan Agent

Enabled  Yes       Secure Marking Enabled? ☐
Agent Status  Running
Last Communication 7-Jan-2017 08:58

[Agent Details]

Last Edited

Date Last Edited  13-Jan-2017 09:40
Last Edited By  USER 2

| CONTENT & DOCUMENT ACTIVITY LOG(S) | | | | |
|---|---|---|---|---|
| WHAT | WHO | WHEN | WHERE | ACTION |
| DOCUMENT A | USER 1 | 8/1/14 14:00 | XYZ | ALLOW |
| DOCUMENT A | USER 2 | 10/2/16 23:00 | XYZ | BLOCK |
| DOCUMENT P | USER 4 | 8/1/17 22:00 | XYZ | LOG |

FIG. 18

SYSTEM AND METHOD OF PROCESSING DOCUMENTS TO PROVIDE DOCUMENT HISTORY AND COMPLIANCE CONTROL

BACKGROUND

This disclosure relates to systems and methods of reading, tracking and trending of content and documents identified by secure document making technologies.

Today, many document processing systems offer tracking and user details of processed documents based on users, when documents are processed, where, document name, but without correlation that a particular document it is of the system documents are processed and has taken a specific life-cycle of use by various users.

While existing systems offer various levels of control of documents as they are exchanged in electronic form, this disclosure and the exemplary embodiments described herein address a gap in the area of securing a document after it has been rendered to paper (printed) and is transitioning back to digital (scanned) and provides the ability to monitor and protect the transportation of a physical printed document.

INCORPORATED BY REFERENCE

U.S. Patent Publication No. 2014/0043646, published on Feb. 13, 2014, by Levine et al. and entitled "METHOD AND SYSTEM FOR AUTOMATED HARDCOPY CHANGE NOTIFICATION";

U.S. Patent Publication No. 2014/0320874, published on Oct. 30, 2014, by Tredoux et al. and entitled "SYSTEM AND METHOD FOR INCORPORATING SECURITY ELEMENTS IN PRINTED DOCUMENTS IN AN INSECURE ENVIRONMENT";

U.S. Pat. No. 8,515,923, issued Aug. 20, 2013, by Wenn et al. and entitled "ORGANIZATIONAL USAGE DOCUMENT MANAGEMENT SYSTEM";

U.S. Pat. No. 7,590,934, issued Sep. 15, 2009, by Hubert et al. and entitled "META-DOCUMENT AND METHOD OF MANAGING";

U.S. Pat. No. 8,699,075, issued Apr. 15, 2014, by Privault et al. and entitled "PRINTER IMAGE LOG SYSTEM FOR DOCUMENT GATHERING AND RETENTION"; and U.S. Patent Publication No. 2015/0100389, published on Apr. 9, 2015, by DeRoller et al. and entitled "SYSTEMS AND METHODS FOR TRACKING USER-UPTIME FOR MANAGED PRINT SERVICES IN MANAGED OFFICE DEVICES".

BRIEF DESCRIPTION

In one embodiment of this disclosure, described is a document processing system including one or more multifunction devices (MFDs) configured to perform one or more of document printing, document scanning, document copying and document faxing, the one or more MFDs operatively connected to a network; one or more user workstations operatively connected to the network, the one or more user workstations configured to digitally process a content associated with a digital representation of a document; one or more servers operatively associated with the one or more MFDs and the one or more user workstations, the one or more servers operatively connected to the network and the one or more servers operatively associated with a document management system, the one or more MFDs, the one or more workstations, and the one or more servers, and the document management system is configured to: a) generate a unique secure mark associated with an original document created by one of the MFDs and workstations; b) register in a document registry database the unique secure mark associated with the original document and associating the unique security mark with metadata associated with the original document including a document creator, document creation time, document name and document security protection level; c) monitor document activity associated with all or part of the original document by detecting a presence of the unique security mark during a next occurrence of all or part of a content of the original document within an active document associated with the document activity, the document activity including one or more of printing the active document, scanning the active document, copying the active document, faxing the active document and digitally processing a digital representation of the active document; d) record in an activity log associated with the document registry database the document activity associated with the active document; and e) repeat steps a)-d) for subsequent document activity associated with all or part of the original document.

In another embodiment of this disclosure, described is a document management method associated with a document processing system, the document processing system including one or more multifunction devices (MFDs) configured to perform one or more of document printing, document scanning, document copying and document faxing, the one or more MFDs operatively connected to a network; one or more user workstations operatively connected to the network, the one or more user workstations configured to digitally process a content associated with a digital representation of a document; one or more servers operatively associated with the one or more MFDs and the one or more user workstations, the one or more servers operatively connected to the network and the one or more servers operatively associated with a document management system, the one or more MFDs, the one or more workstations, and the one or more servers, the method comprising: a) generating a unique secure mark associated with an original document created by one of the MFDs and workstations; b) registering in a document registry database the unique secure mark associated with the original document and associating the unique security mark with metadata associated with the original document including a document creator, document creation time, document name and document security protection level; c) monitoring document activity associated with all or part of the original document by detecting a presence of the unique security mark during a next occurrence of all or part of a content of the original document within an active document associated with the document activity, the document activity including one or more of printing the active document, scanning the active document, copying the active document, faxing the active document and digitally processing a digital representation of the active document; d) recording in an activity log associated with the document registry database the document activity associated with the active document; and e) repeating steps a)-d) for subsequent document activity associated with all or part of the original document.

In still another embodiment of this disclosure, described is a document processing system including one or more multifunction devices (MFDs) configured to perform one or more of document printing, document scanning, document copying and document faxing, the one or more MFDs operatively connected to a network; one or more user workstations operatively connected to the network, the one or more user workstations configured to digitally process a content associated with a digital representation of a document; one or more servers operatively associated with the one or more MFDs and the one or more user workstations, the one or more servers operatively connected to the network and the one or more servers operatively associated with a document management system, the one or more MFDs, the one or more workstations, and the one or more servers, and the document management system is configured to: a) generate a unique secure mark associated with an original document created by one of the MFDs and workstations; b) register in a document registry database the unique secure mark associated with the original document and associating the unique security mark with metadata associated with the original document including a document creator, document creation time, document name and document security protection level; c) monitor document activity associated with all or part of the original document by detecting a presence of the unique security mark during a next occurrence of all or part of a content of the original document within an active document associated with the document activity, the document activity including one or more of printing the active document, scanning the active document, copying the active document, faxing the active document and digitally processing a digital representation of the active document; d) record in an activity log associated with the document registry database the document activity associated with the active document; and e) repeat steps a)-d) for subsequent document activity associated with all or part of the original document; control a user's ability to perform one or more of printing, scanning, copying and faxing an active document based on access privileges associated with the user which are attributed to the secure mark associated with the active document; and trigger an alarm if the document is in proximity to one or more predetermined areas operatively associated with RFID readers.

BRIEF DESCRIPTION OF THE DRAWINGS

FIG. 11 shows an example of an administrator interface content security screen for enabling secure marking associated with a document management system according to an exemplary embodiment of this disclosure.

FIG. 12 shows an example of an administrator interface content security screen for establishing security levels associated with a document management system according to an exemplary embodiment of this disclosure.

FIG. 14 shows an example of an administrator interface content security screen for enabling and configuring particular devices for documents processed according to an exemplary embodiment of this disclosure.

FIG. 15 shows an example of another administrator interface content security screen for enabling and configuring particular devices for documents processed according to an exemplary embodiment of this disclosure.

FIG. 18 shows an example of an activity document log according to an exemplary embodiment of this disclosure.

DETAILED DESCRIPTION

Figure 1:
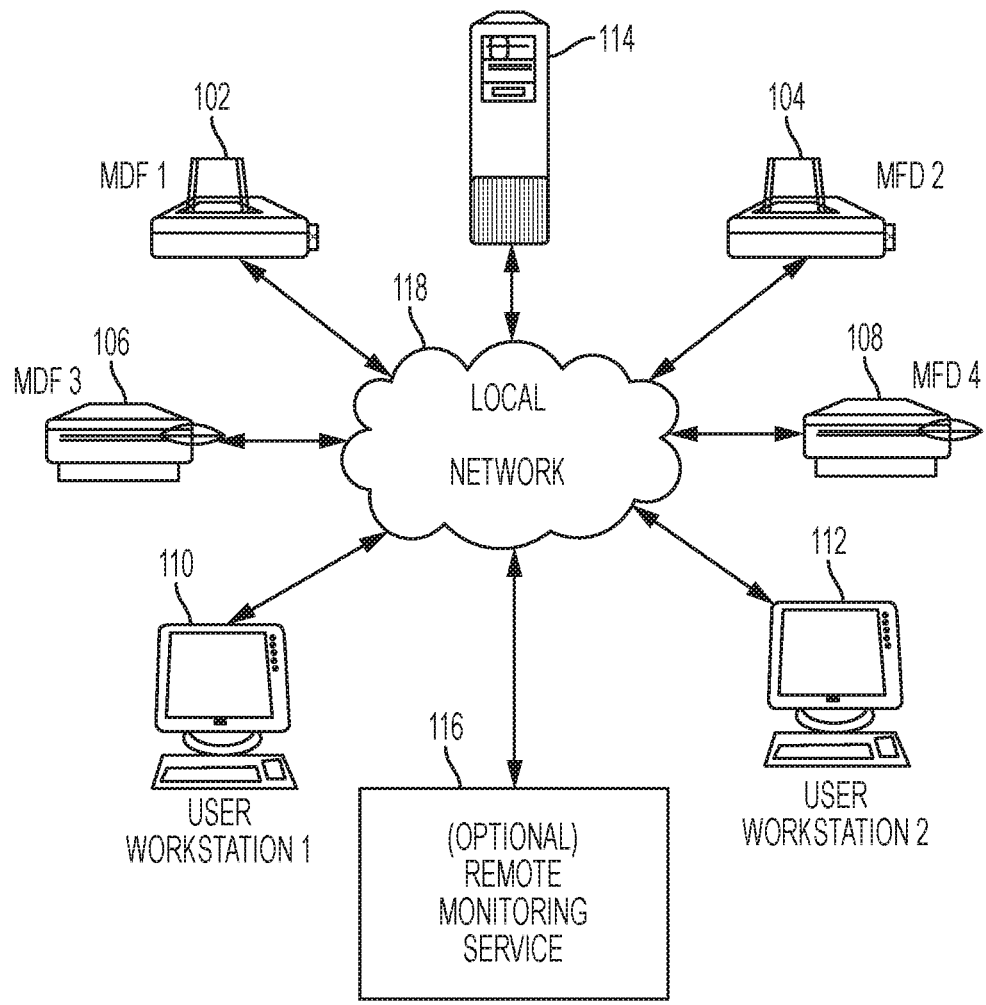
FIG. 1 is a block diagram of a document management system according to an exemplary embodiment of this disclosure.

This disclosure and the exemplary embodiments described herein provides systems and methods of processing documents to provide document history and compliance control. Specifically, the systems and methods relate to the application, reading, tracking and trending of content and documents identified by secure document making technologies.

According to an exemplary embodiment, a document management system includes a process by which document metadata details are embedded in a document marking and can be read by the document management system to monitor incremental activity associated with the document. In addition, the document management system provides a method to view and analyze how content is used throughout a business based on recognizing common document content used by different users, different organizations, different documents, and different document processes. A full organizational audit history of the document is generated and available to users of the document management system to monitor the activity/processes performed on the document. Security controls can be applied to the document as it traverses across the paper-digital domain with the meta data embedded in the document.

Secure document marks are created that embed document details within metadata, including but not limited to document name, document creation date, document owner, document creator, document content protection level, and document template, and a registered security system centrally deciphers, organizes and analyzes any document activity in relationship to the original document details in combination with the details of any and all subsequent activities.

Using analytics and data correlation techniques that leverage document metadata details embedded in document marking, the centralized docu-management system intelligently recognizes incremental activity on a document or document content to generate a complete view of how the recognized content and documents have been used across the enterprise, thereby providing insight into how frequent, where, who, for what purpose, specific content, specific forms, or business processes have been used by the enterprise.

By creating a complete document history from a 1st document process to an <n>th document process, security controls can be applied based on the document origination, document distributions, document license restrictions, document end of life declarations and others. In addition, users attempting to process a document including a registered secure marking applied will be directed to document services previously configured to monitor for the registered secure document marking. Monitoring, processing and intelligent document recognition is extendable to operations such as Print, Copy, Scan, Fax, Print From.

After a secured mark is recognized by the document management system, any embedded user, time, date, document or other information is read from the marking and the document management system adding to current activities the prior activity logs associated with the original document, document form or document content thereby creating a full audit history that details the initial creation and processing of the document to include any individual document transformations of the original document and content, resulting in a full life-cycle audit trail of documents, content, user activity and more.

According to another aspect of this disclosure, exemplary embodiments of a document management system are described to address a gap in the area of securing a document after it has been rendered to paper (printed) and is transitioning back to digital (scanned). In other words, a document management system is provided to control documents as they are exchanged from electronic form to hard paper form as well as from hard paper form to electronic form. The document management system controls the converting of a document in analog form (paper document) into a digital form (an electronic document) by restricting access to copy, scan, fax, print, etc. Special markers, such as glyphs, microtext, bar code, Quick Response (QR) code, etc., identify the document and include access control information to control user access privileges/restrictions associated with the document and/or content within the document. Document access rights of the person performing an operation on a document are verified against the access rules embedded and/or associated within the document before completing the user requested operation on the document using a device operatively associated with the document management system. According to an exemplary embodiment a rule based process is used to verify the access rights associated with the processed document, thereby providing enhanced protection of scan-based workflows including scan, copy, and fax.

According to another aspect of this disclosure, an exemplary embodiment of a document management method/system is provided to monitor and protect the transportation of a physical printed document.

The document management method and system secures a physical document as the document is transported outside of a secure area through an exit door by raising an alarm, notification and/or render the doors inoperable. The document is printed using a special ink with magnetic/Radio Frequency Identification Device (RFID) capabilities that triggers an alarm when a document is moved through doors equipped with special readers, for example RFID readers, thereby providing physical security of a paper document and preventing users from unknowingly violating an information and security policies associated with the document. Also, protection is provided to protect against malicious users attempting to walk away with printed secure documents.

With reference to FIG. 1, illustrated is a block diagram of a document management system according to an exemplary embodiment of this disclosure. As shown, the system includes MFD (Multifunction Device) 102, MFD 104, MFD 106, MFD 108, user workstations 1 110, user workstations 2 112, a document management server 114 which performs the document management processes described herein and an optional remote monitoring service 116 which may be a web based service to perform document analytics and generate reports including an audit history of documents processed within an enterprise. All devices are interconnected using a local network 118. It is to be understood that while the exemplary embodiments described herein are generally directed to networked MFDs which provide printing, copying, scanning and faxing functions, the document management systems disclosed can include any arrangement of document processing devices.

Figure 2:
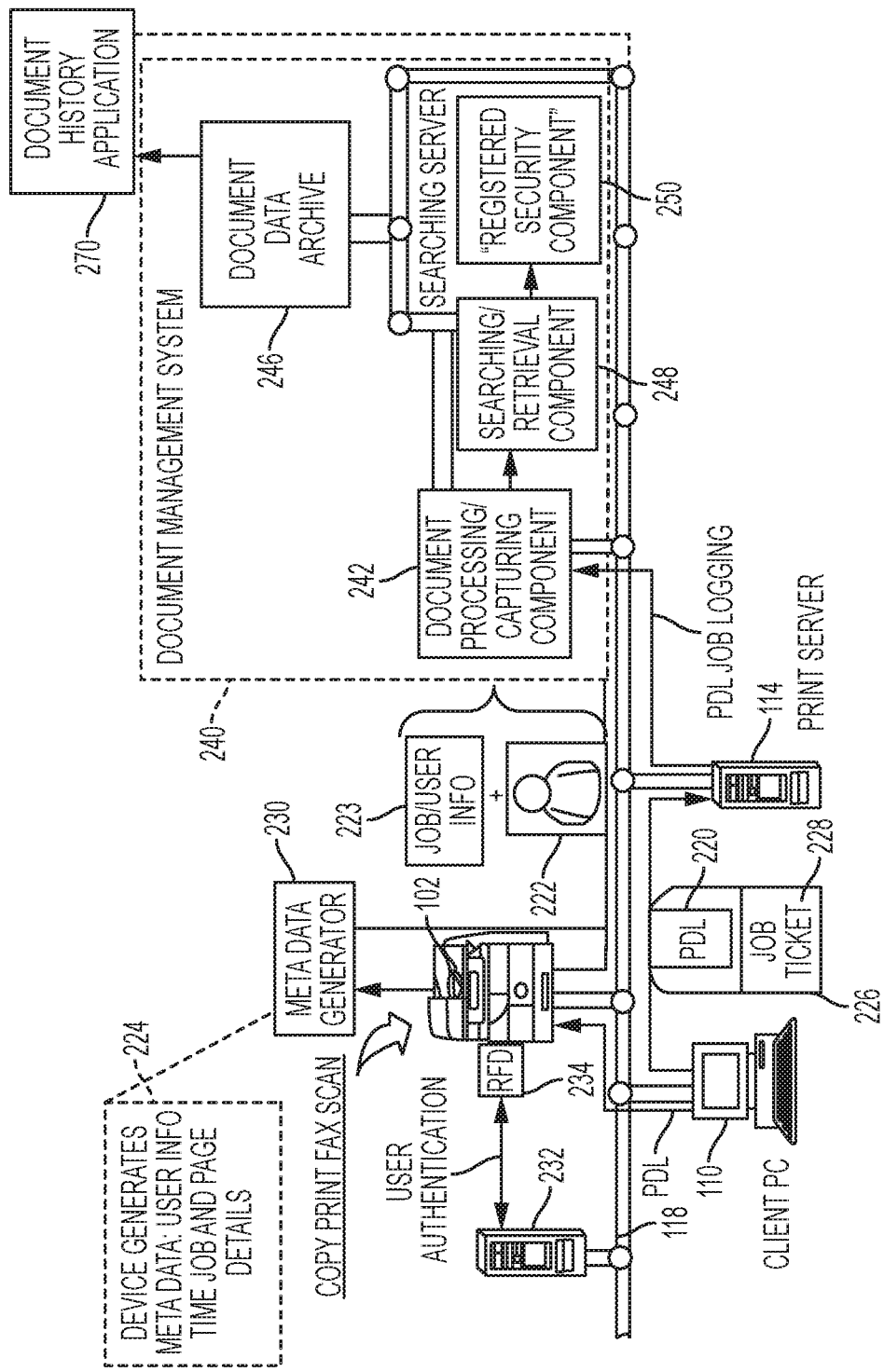
FIG. 2 is another block diagram of a document management system according to an exemplary embodiment of this disclosure.

With reference to FIG. 2, illustrated is another block diagram of the document management system according to an exemplary embodiment of this disclosure. A print network includes a plurality of computing devices 110 on which components may be generated, processed, stacked, received and output, e.g., in a page description language page in the case of a print job. In FIG. 1, an exemplary computing device is illustrated as personal computers 110 and 112 although it is to be appreciated that the network may include many computing devices such as designated computers, laptop computers, PDA's and the like. The computing devices are each communicatively linked, e.g., by a wired or wireless network 118 to one or more image output processing devices 102. In FIG. 1 and FIG. 2 the image output processing devices 102, 104, 106, 108 are illustrated as multifunction devices (MFDS), although it is to be understood that the networked image output processing devices can include printers, scanners, fax machines, and multiples and combinations thereof. Computing devices 110 and 112 are linked to the output devices 102, 104, 106 and 108 via a network print server 114.

For each document handled, captured or other processed by each image processing device on the network, and more generally through an enterprise, document data 222 is acquired in the form of digital copies of document images. Log or metadata 223 is also acquired, such as the source of the document, e.g., the user ID, the time that the document was revised, printed, scanned, faxed, etc., and job content details. Document images may also be acquired by MFD 102. Alternatively, where a print server 114 is intermediate the outputting computer 110 and the output device 102, document images and metadata are acquired by one or both of the print server 114 and the document management system 240 residing on the print server 114 or other dedicated server. Log or metadata information can be obtained in various ways, depending on the type of document and/or document content. For a print job 226, the time at which the print job is sent as well as its source may be extracted from a job ticket 228 by a metadata generator 230, which may be resident in the printer or server. Alternatively, the metadata generator 230 can be in the form of a separate job tracking agent such as a server or other computer linked to the network.

In one embodiment, each client device 110 includes a job/document tracking agent 230 which generates metadata information 224 for each document processed and captures associated image data 222.

For a copy or scan job, a user identification systems 232, such as an RFID system, which includes a detector 234, may automatically identify the person generating the copy or scan, e.g., by detecting information on an RFID device carried by the user. Other methods of acquiring ID information include keypad, voice recognition system, or the like.

A document management system 240 processes all documents processed on the network to generate unique security marks associated with processed documents, read security marks included in processed documents, and generate comprehensive historical records of activities associated with the security marks, i.e., the documents associated with the security marks. As shown in FIG. 2, the document management system 240 includes a document processing/capturing component 242, a searching/retrieval component 248, a "registered" security component 250, a document data archive component 246 and a document history application 270.

Various details and aspects of the document management process/system are now described.

Admin User Experience: (FIG. 3)

Figure 3:
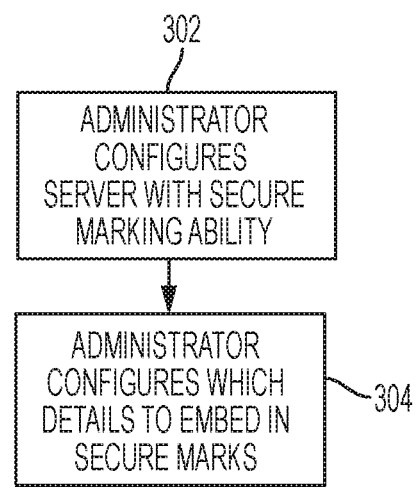
FIG. 3 is a flow chart of an administrator configuration process associated with a document management system according to an exemplary embodiment of this disclosure.

With reference to FIG. 3, shown is a flow chart of an administrator configuration process associated with a document management system according to an exemplary embodiment of this disclosure.

By configuring the server with secure marking ability, the server automatically creates and applies secure marking technologies to include document creation details, and the centralized and managed document system automatically associates future activity with this same original document and original content information.

For example, the administrator configures the application of document markings for print, copy, scan, fax to include document creation details for later identification, and the administrator configures monitored nodes and active participants of a centralized monitoring service for respective workflows.

Initially, at step 302, an administrator configures the server with secure marking ability. Next, at step 304, the administrator configures which document or document content details to embed in the secure marks.

Authorized User Experience: (FIG. 4)

Figure 4:
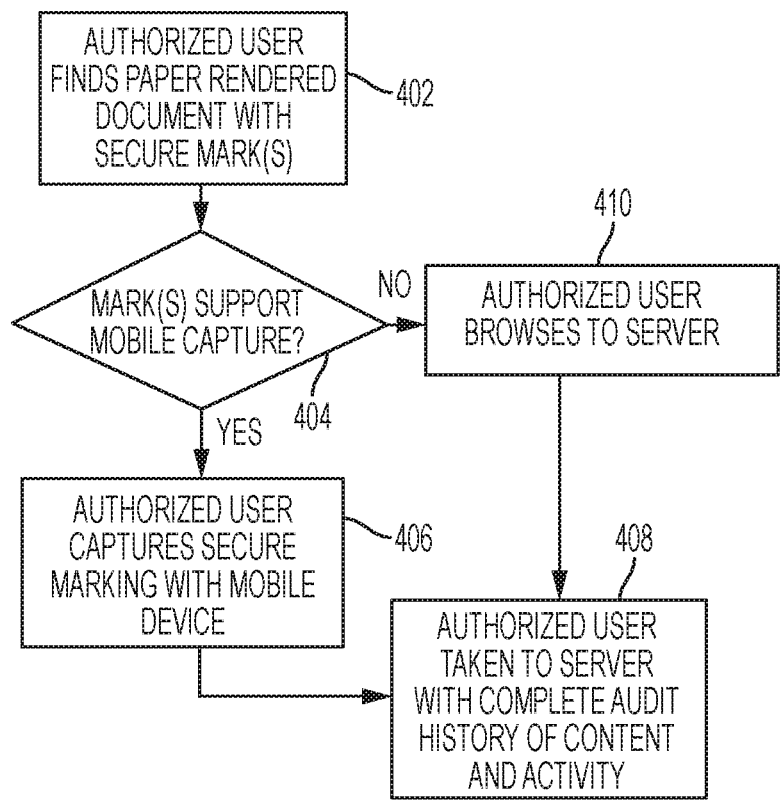
FIG. 4 is a flow chart of an authorized user's activity experience associated with a document management system according to an exemplary embodiment of this disclosure.

With reference to FIG. 4, shown is a flow chart of an authorized user's activity experience associated with a document management system according to an exemplary embodiment of this disclosure.

Initially, at step 402, an authorized user identifies a document with a service mark and they would like to understand the history of the document.

At steps 404 and 406, the authorized user accesses a document management server with secure marking ability via a mobile device scan of the secure marking on document.

At step 408, the authorized user is able to review the history of the scanned document and content.

Alternatively, if step 404 determines the secure mark is not supported with mobile capture, the process proceeds to step 410 where the user browses to the document management server, and next, at step 408, authorized user connected to the document management server which provides the history of the document and/or content.

As a secure mark is recognized by the system, any embedded user, time, date, document or other information will be read from the marking to add to any prior activity logs of the original document, form or content, thereby creating a full audit history that details the initial creation or processing and any individual document transformations of the original subsequent versions of the document and content, resulting in a full life-cycle audit trail of documents, content, user activity and more.

End User Experience: (FIG. 5)

Figure 5:
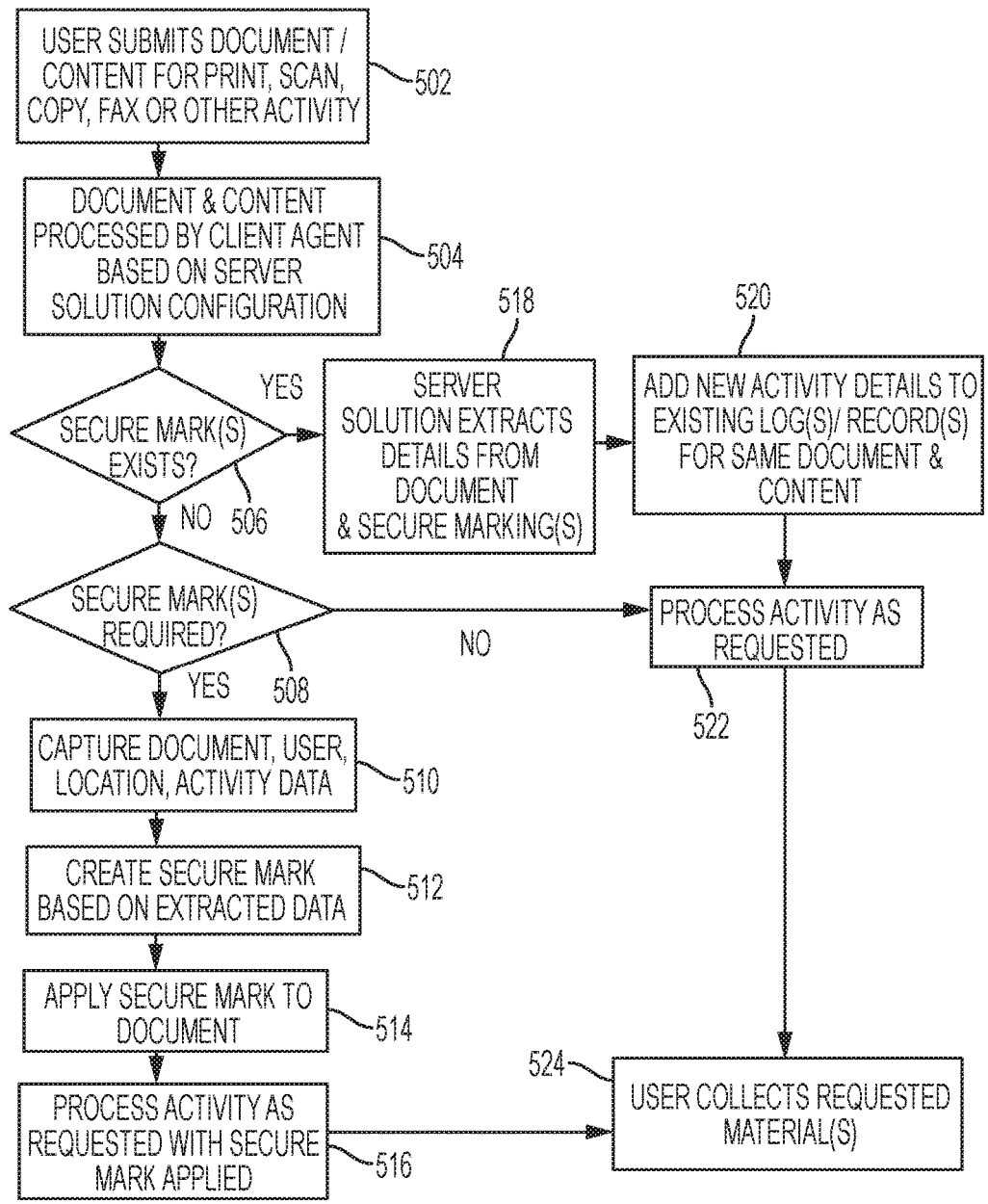
FIG. 5 is a flow chart of a user's experience associated with a document management system according to an exemplary embodiment of this disclosure.

With reference to FIG. 5, shown is a flow chart of a user's experience associated with a document management system according to an exemplary embodiment of this disclosure.

Users produce documents in the same fashion they have done in the past, however the document management system provides incremental document marking, depending on the marking technology selected by the administrator during solution configurations.

Initially, at step 502, a user submits a document/content for print/scan, copy, fax or other activity.

Next, at step 504, the document and content are processed by the client agent based on the server configuration provided by the administrators.

Next, at step 506, the process determines if a secure mark exists on the processed document.

If the document includes a secure mark, at step 518 the document management server extracts details from the document and secure mark(s). Next, at step 520, the process adds the new activity details to existing activity logs associated with the processed document and/or document content and at step 522 the system processes the document requested.

If the document does not include a secure mark, step 508 determines if a secure mark is required. If not service mark is required, the process advances to step 522 where the document processing requested by the user completed.

If at step 508 the system determines a secure mark is required, the system applies a secure mark to the document. Step 510 captures the document, the user location, activity data, etc. Step 512 creates a secure mark based on the extracted data, step 514 applies the secure mark to the document and step 516 processes the document user requested document activity as registered with a secure mark applied.

At step 524, the user collects any requested document materials processed.

Figure 6:
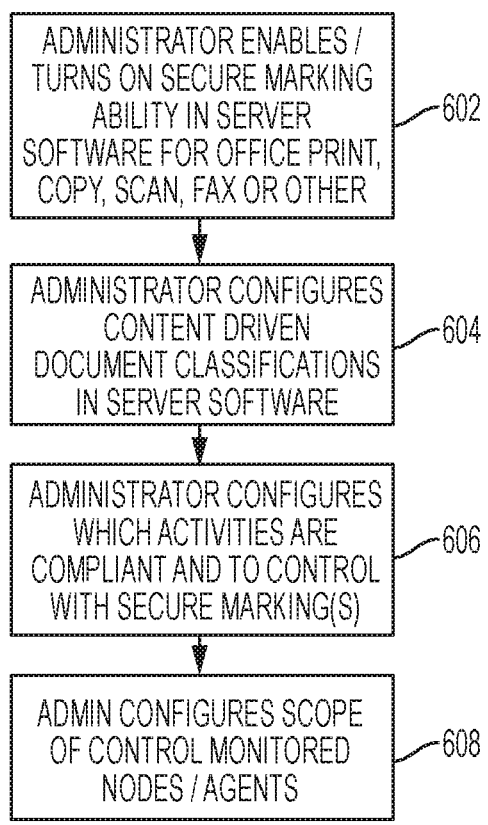
FIG. 6 is a flow chart of an administrator configuration process including control of compliant activities associated with a document management system according to an exemplary embodiment of this disclosure.
Figure 7:
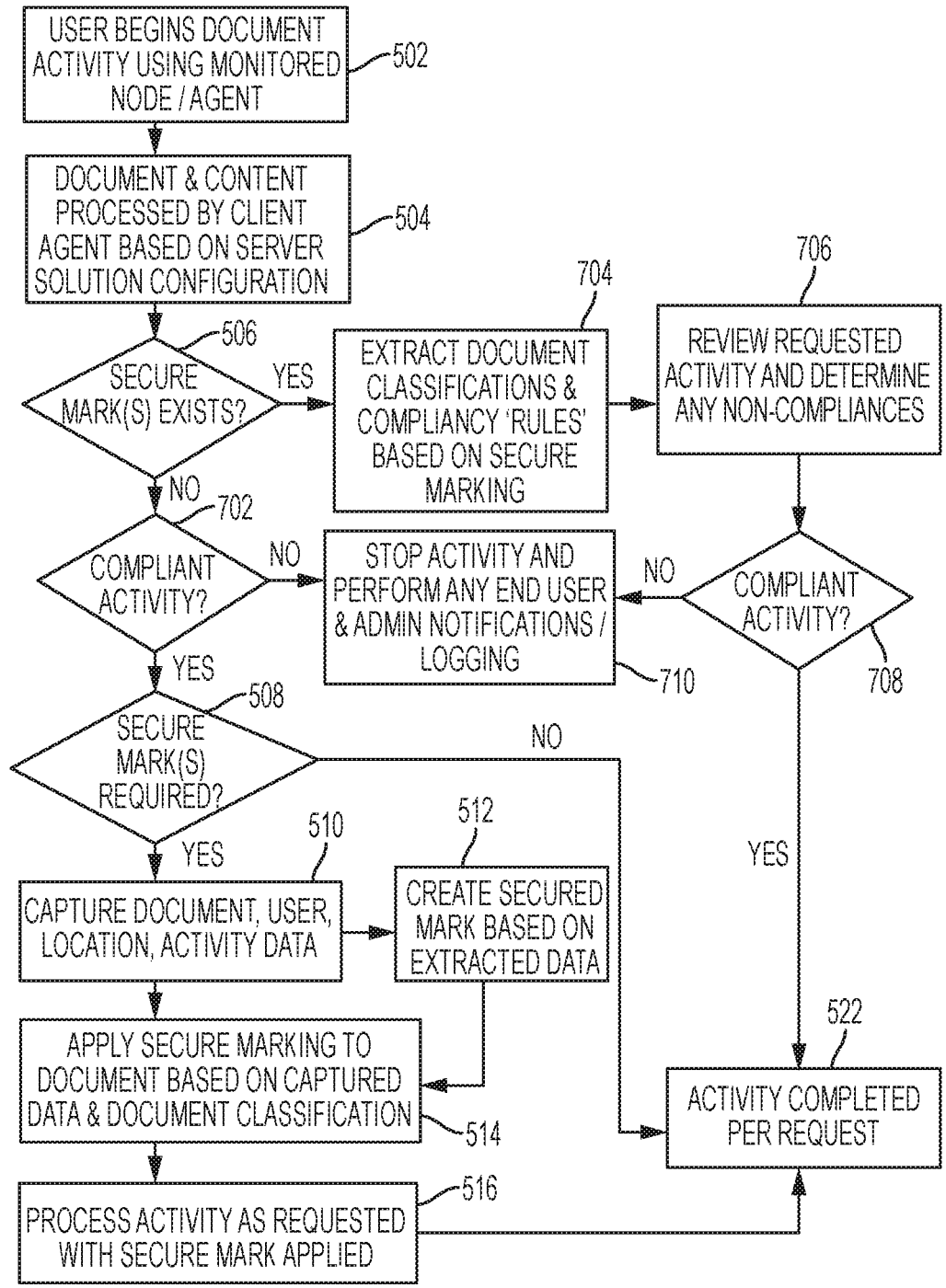
FIG. 7 is a flow chart of a user's experience associated with a document management system including control of compliant activities according to an exemplary embodiment of this disclosure.

With references to FIG. 6 and FIG. 7, now described is another document management system according to an exemplary embodiment of this disclosure. FIG. 6 is a flow chart of an administrator configuration process including control of compliant activities associated with a document management system and FIG. 7 is a flow chart of a user's experience associated with a document management system including control of complaint activity. The document management system provides the ability to intercept documents as they are processed in order to identify their content and usage, and correlate any prior activity of the original or later version of the content or document; create a life cycle view of an organization's use of content and documents across their enterprise; read, recognize and extract embedded data from a secure marking technology such as glyph, image or QR code to identify and categorize the specific content and document being used in relation to other known content and documents processed; and automatically apply a document specific marking on print, copy, scan, fax, and other that represent document details such as document form, owner, user, date, time, and destination. In addition, users will not unknowingly violate an information and security violation based on configured document controls; clients have access to usage trends, history and behaviors detailing who, when and how frequent their user community uses specific organizational data and documents; and clients are able to see opportunities for process and document workflow optimization.

The document management system shown in FIG. 6 and FIG. 7 provides a system in which users converting a document in analog form (paper document) into a digital form (an electronic document) are access controlled (restricted to copy, scan, fax, print, etc.), and prohibited from doing so if the access control does not allow such behavior. Special markers (e.g., glyphs, micro-text, bar code, Quick Response (QR) code, etc.) either identify the document or contain access control information within them. For this workflow, the access rights of the person performing the operation on a document are verified against access rules embedded within the document before completing the requested operation on the document using the requested device. A rule based system verifies the access rights. The system generates a full document lifecycle across the digital/physical boundary and provides enhanced protection of scan-based workflows (Scan, Copy, Fax).

By registering with the document management system an organization's known secure markings with associated levels of access and governance each marking represents, paper documents can be secured and controlled based on the image recognition of the existing secure markings and application of controls that align with those marking(s). Users attempting to process (scan) a document with an existing secure mark printed on it, such as a watermark, glyph, micro-text, or registered QR Code are restricted to what that secure marking process and their associated user permissions have been pre-configured to allow. Control can be extended to operations such as copy, scan, fax, and print from.

Administrator User Experience: (FIG. 6)

With reference to FIG. 6, shown is an administrator configuration process including control of compliant activities associated with a document management system according to an exemplary embodiment of this disclosure.

Initially, at step 602, an administrator enables/turns off secure marking ability in the server software for office print, copy, scan, fax or other.

Next at step 604, the administrator configures content driven document classifications in the server software.

Next at step 606, the administrator configures which activities are compliant and controlled with secure markings.

Finally, at step 608, the administrator configures the scope of control monitored modes/agents.

The document management system incorporates secure marking technologies into a content and information security solution, where administrators define what level of security a marking represents and what activities and operations should be approved or controlled. This allows an organization to extend their document and information security to include controls after the document has left electronic formats and has transitioned into paper form for later use.

When documents with secure marking are processed in later future times, a detailed history of the document and the content use is available based on recognition of the secure mark and associated security permissions. i.e. "Document X was printed by User 1 at this time/place, copied by User 2 at this time/place, scanned in by User 3 at this time/place, and then printed by User 3 at this time/place."

When secure marking technologies that embed information are recognized, any embedded user, time, date, or other information is read from the marking to apply respective controls and add to any prior activity logs of the same information, thereby creating a full audit history that details the initial creation of the document and any individual document transformations of the original document and content, resulting in a full life-cycle audit trail documents, content, user activity and more.

End User Experience: (FIG. 7)

With reference to FIG. 7, shown is a flow chart of a user's experience associated with a document management system including control of compliant activities according to an exemplary embodiment of this disclosure.

Initially, at step 502, a user begins a document activity using a monitored mode/agent.

Next, at step 504, the document and document content are processed by a client agent based on the server solution configuration.

Next, at step 506, the system determines if a secure mark exists on the document. If the document includes a secured marks, step 704 extracts document classifications and compliancy rules based on the secure markings; step 706 reviews the requested activity and determines any non-compliance rules associated with the document; step 708 determines if the requested activity is compliant. If the activity is compliant, step 522 completes the requested activity. If the activity is not compliant, step 710 stops the requested activity and performs any end user and administrator notifications and logging.

If at step 506, the system determines a secure mark does not exist on the document, step 702 determines if the requested activity is compliant and step 710 stops the activity if it is not compliant as well as performing any end user and administrator notifications and logging. If at step 702 the system determines the activity is compliant, step 509 determines if a secure mark is required on the document. If no secure mark is required, step 522 completes the activity requested. If a secure mark is required, steps 510, 514 and 516 capture the document, user, location, activity data and apply a secure mark to the document based on the captured metadata. Finally, at step 522 the activity requested is completed.

Figure 8:
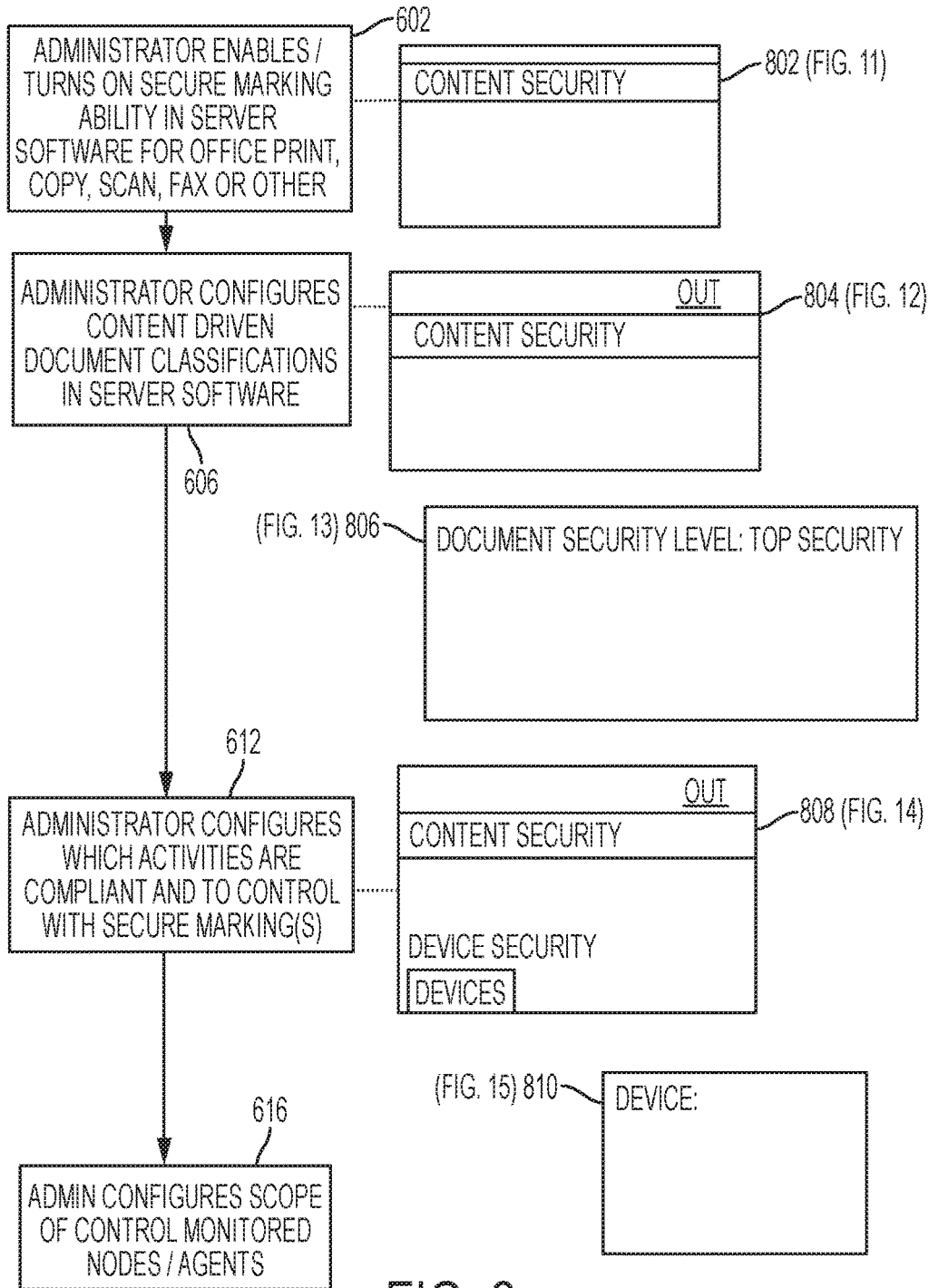
FIG. 8 is a flow chart of another administrator configuration process including control of compliant activities associated with a document management system, the flow chart also including examples of screen displays available to an administrator.

With referenced to FIG. 8, shown is another flow chart representative of FIG. 6, FIG. 8 including the administrator configuration process including control of compliant activities and including examples of screen displays 802, 804, 806, 808 and 810 available to the administrator for viewing and configuration. The example screen displays are illustrated in FIG. 11, FIG. 12, FIG. 13, FIG. 14 and FIG. 15 respectively.

Figure 9:
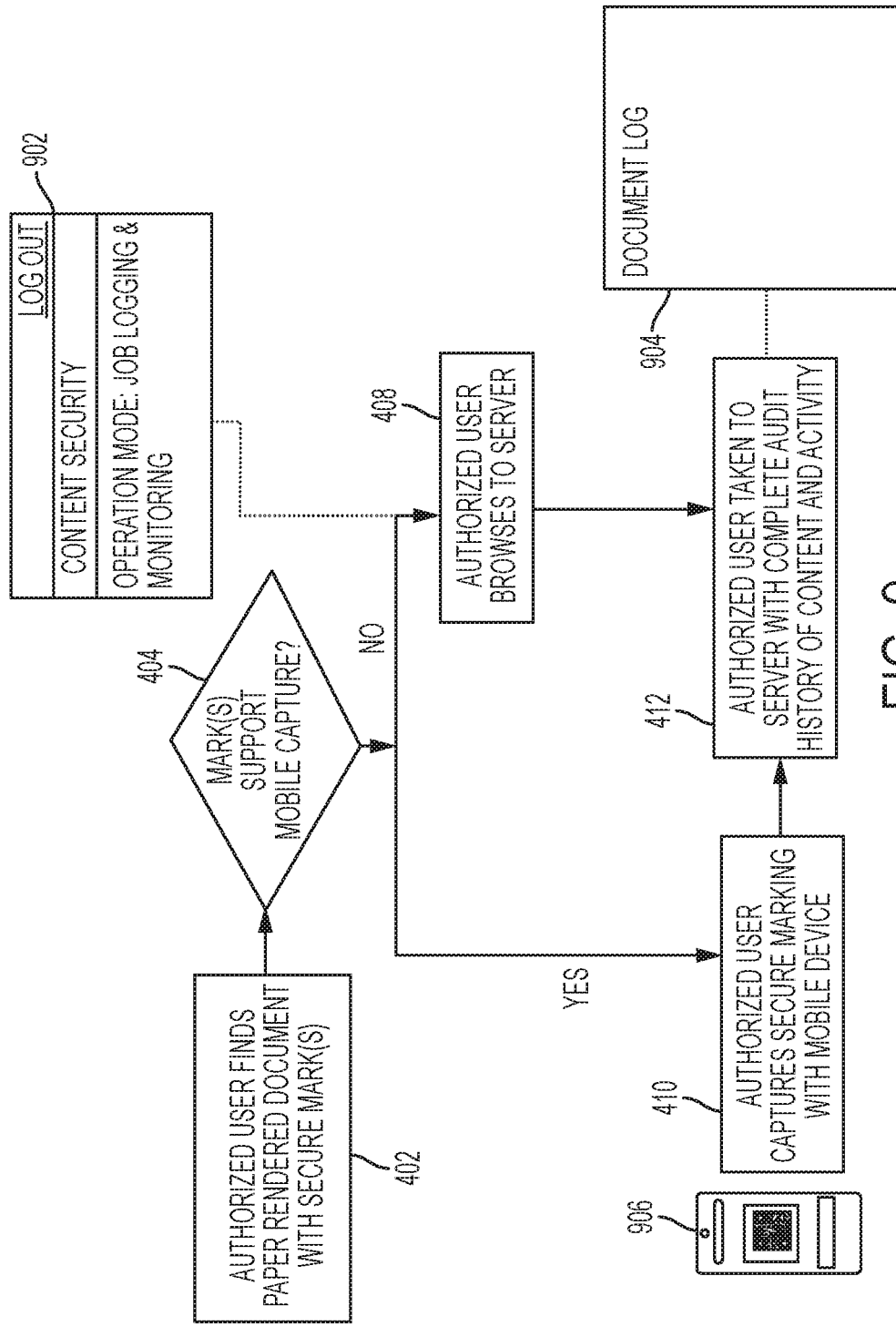
FIG. 9 is a flow chart of an authorized user's experience including mobile capture of a secure marking associated with a document management system according to an exemplary embodiment of this disclosure.
Figure 16:
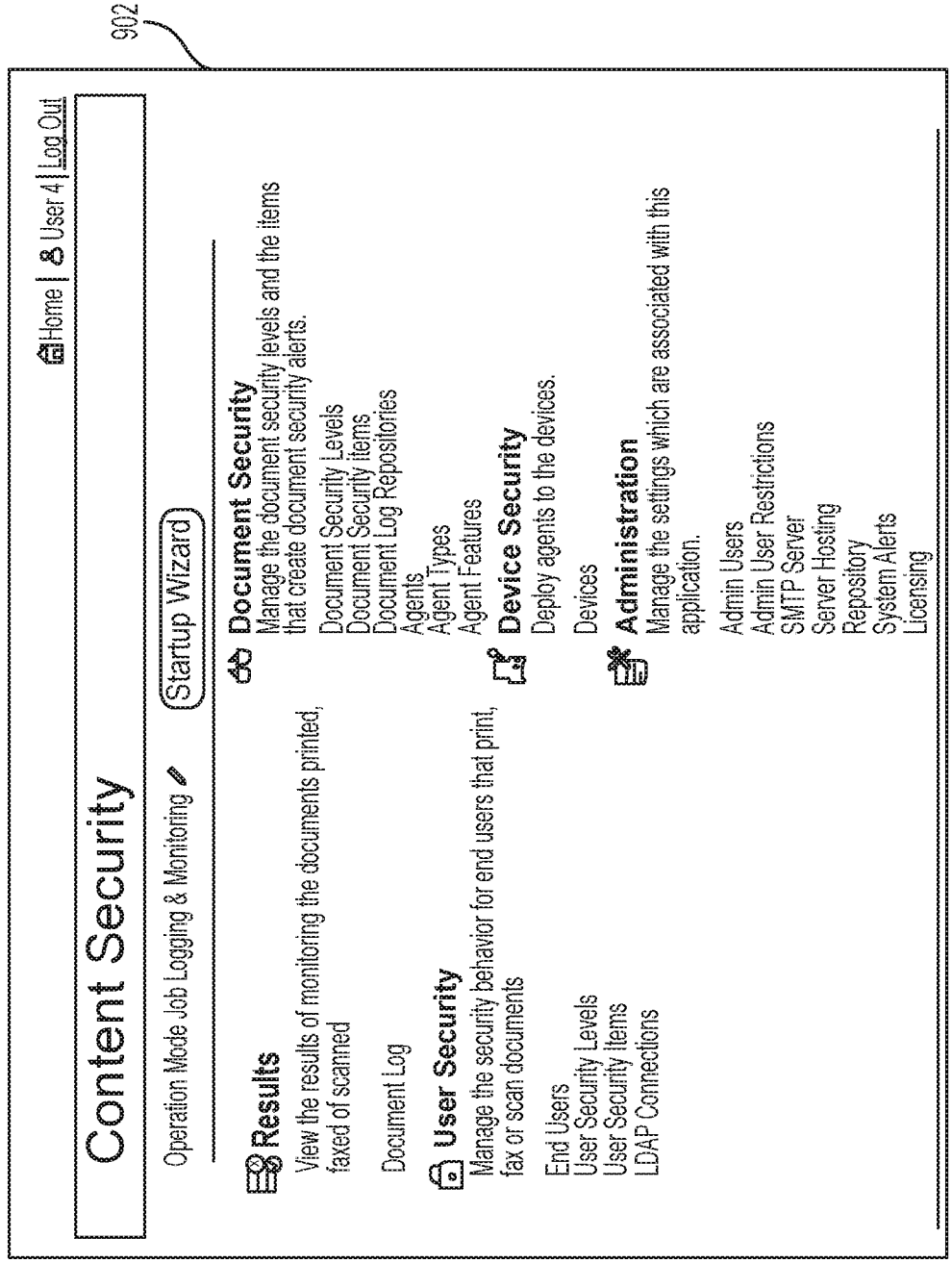
FIG. 16 shows an example of an authorized user interface content security screen associated with a document management system according to an exemplary embodiment of this disclosure.
Figure 17:
FIG. 17 shows an example of a document log available to an authorized user of a document management system according to an exemplary embodiment of this disclosure.

With reference to FIG. 9, shown is another flow chart representative of FIG. 4, FIG. 4 including an authorized user's experience including mobile capture of a secure marking associated with a document management system using a mobile device 906 using a mobile device 916 and examples of screen displays 902 and 904 available to the user. The example screen displays are illustrated in FIG. 16 and FIG. 17 respectively.

Figure 10A:
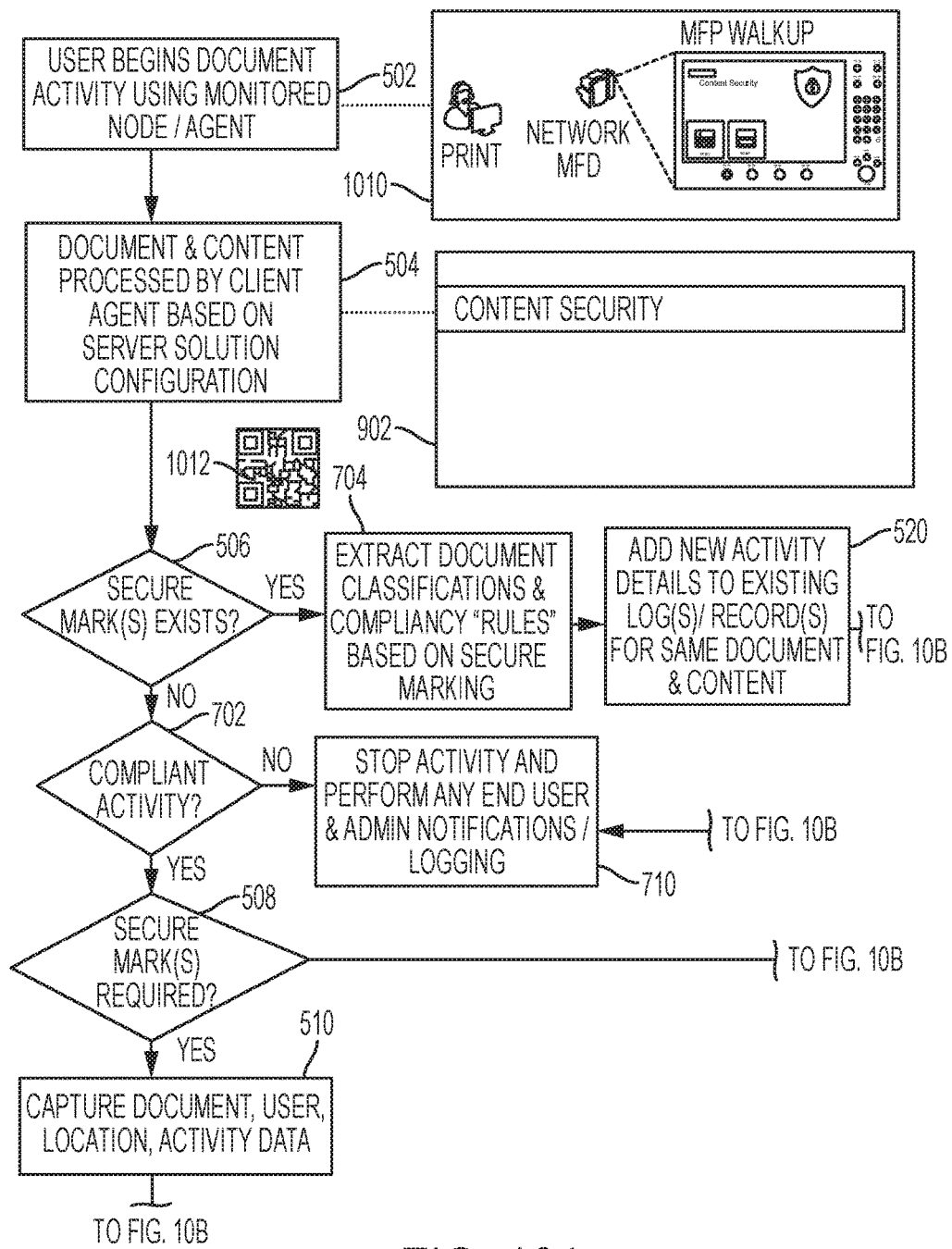
FIGS. 10A and 10B are flow charts of a user's experience associated with a document management system including control of compliant activities according to an exemplary embodiment of this disclosure.
Figure 10B:
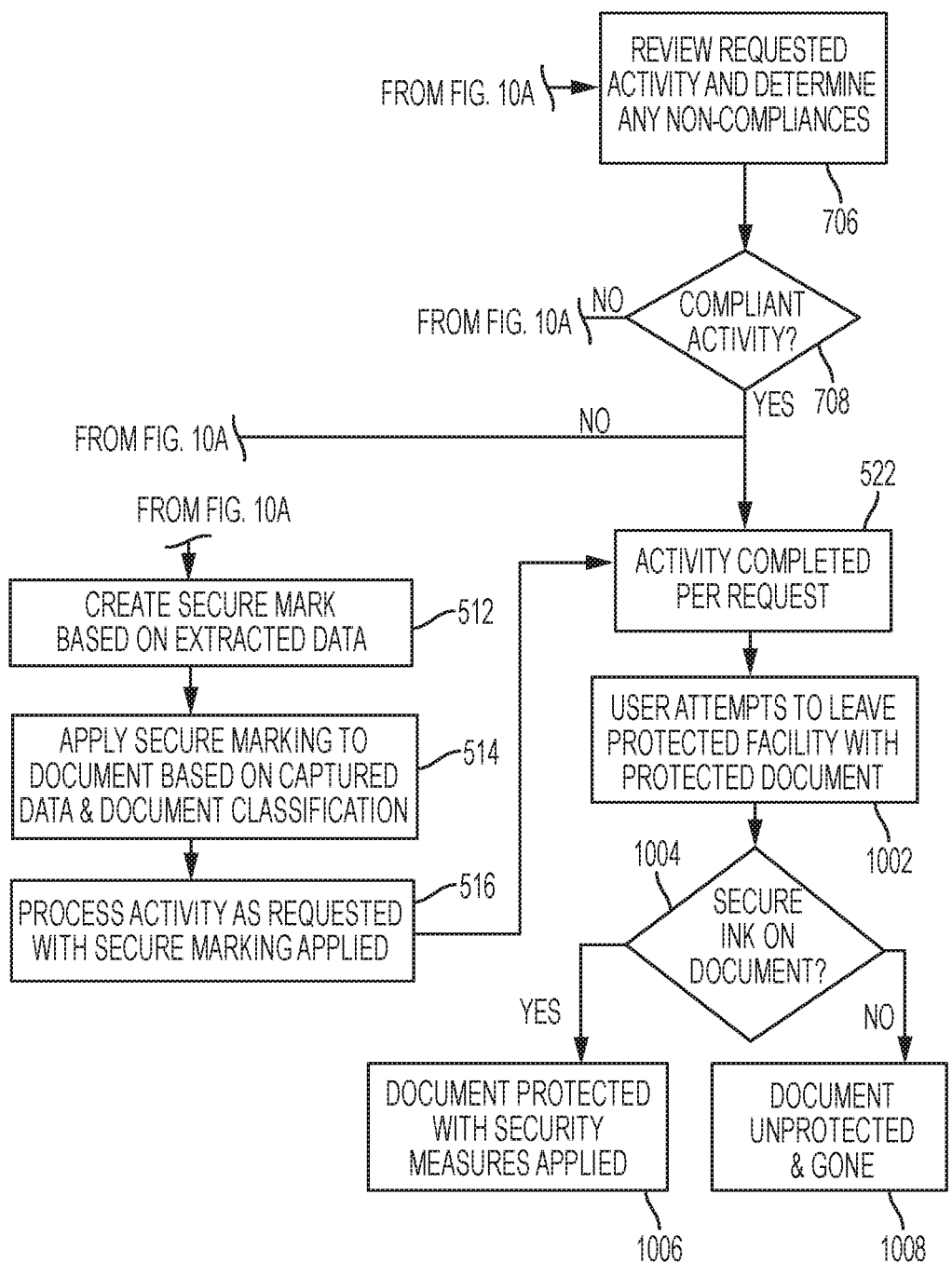
Figure 13:
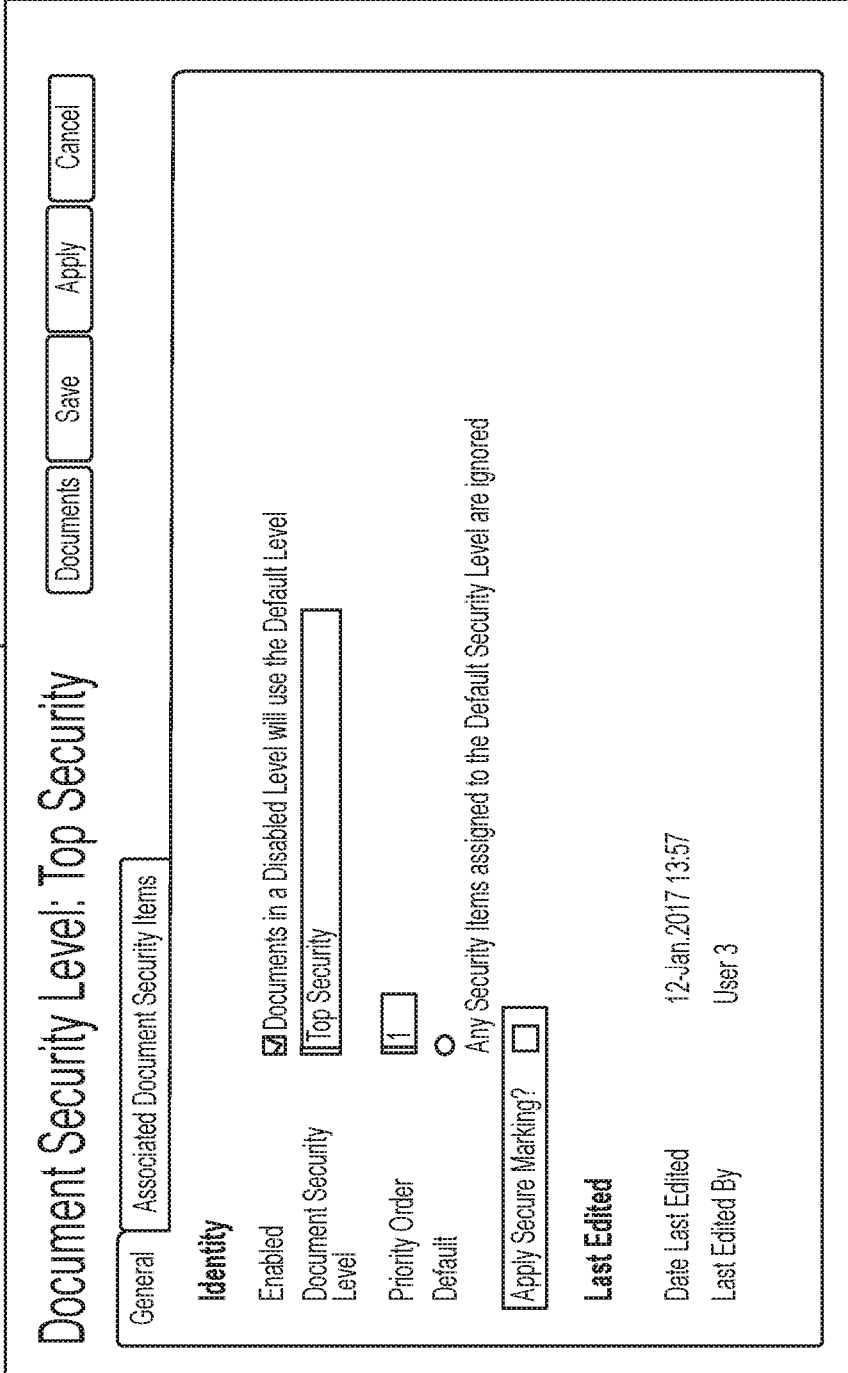
FIG. 13 shows an example of another administrator interface content security screen for establishing security levels for documents processed according to an exemplary embodiment of this disclosure.
Figure 19:
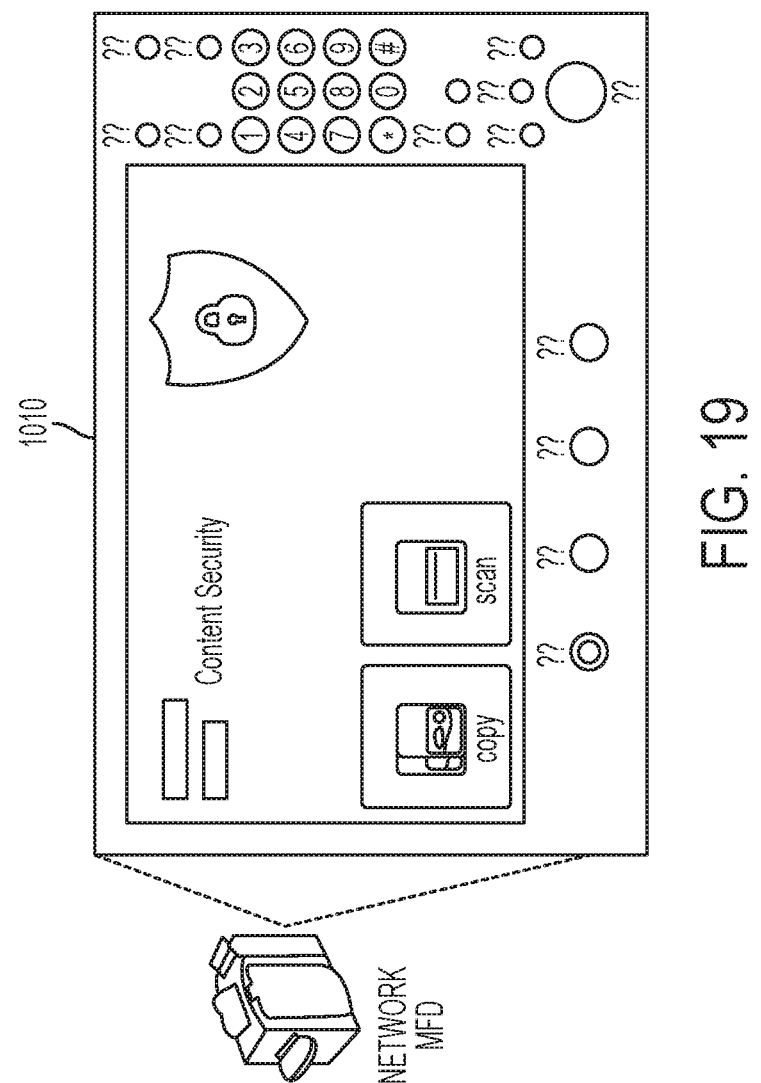
FIG. 19 is an illustration of a multifunction Device (MFD) graphical user interface according to an exemplary embodiment of this disclosure.

With reference to FIGS. 10A and 10B, shown is another flow chart of a user's experience associated with a document management system including control of compliant activities according to another exemplary embodiment of this disclosure. FIGS. 10A and 10B also include example screen displays/user interfaces 1010 and 902 associated with step 502 and step 504 as previously described with reference to FIG. 5. The example screen displays/user interfaces are shown in FIG. 19 and FIG. 16 respectively. Reference character 1012 shows an example of a secure mark including a QR code.

In addition to steps 502, 504, 506, 508, 510, 512, 514, 516, 520 and 522 which were previously described with reference to FIG. 5, and in addition to steps 702, 704, 706, 708 and 710 which were previously described in reference to FIG. 7, processes shown in FIGS. 10A and 10B include processes executed by the document management system after the document management system completes the activity requested by the user at step 522, where a secure mark is produced with a security ink on a printed document.

Specifically, at step 1002, the system determines if a user is attempting to leave a protected facility with a document including a secured mark as determined in step 1004.

If at step 1004, the document is protected with a secure mark, security measures are applied at step 1006, after which the document is unprotected at step 1008.

With reference to FIG. 18, illustrated is an example of an activity log generated by the document management system according to an exemplary embodiment.

By applying security to documents and information based on existing secure marking, users complying with security policy and information will see no difference in their experience. Users that are unaware of potential violations or users that are attempting to perform malicious activity can experience document controls as the system is able to automatically apply proper security controls based on set permissions against the user, information, location or others settings.

The document management system provides a security of physical documents if the documents are transported outside of a secure area through an exit door which will raise an alarm, notification or render the doors inoperable. A document is printed using special ink with magnetic/Radio Frequency Identification Device (RFID) capabilities that triggers an alarm when the document is moved through doors equipped with special readers (e.g., RFID readers), thereby providing physical security of the paper document.

In other words, by producing printed documents to include a 'secure' ink/toner (i.e., with magnetic/wireless/antennae RFID capabilities), users are unaware their document has been produced with technology enabling physical tracking and monitoring once produced and transported in a controlled environment. Once a secure content has been printed and the user with the document enters proximity with boundary protection systems, a close loop communication is detected and users encounters applied security restrictions. Once the printed document with the 'secure' ink/toner is taken to the protected facility exit areas, restrictions can be in the form of audible or silent alarm, electronic mantrap, security notification, inoperable doors or other.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A document processing system comprising:
   one or more multifunction devices (MFDs) configured to perform one or more of document printing, document scanning, document copying and document faxing, the one or more MFDs operatively connected to a network;
   one or more user workstations operatively connected to the network, the one or more user workstations configured to digitally process a content associated with a digital representation of a document;
   one or more servers operatively associated with the one or more MFDs and the one or more user workstations, the one or more servers operatively connected to the network and the one or more servers operatively associated with a document management system, the one or more MFDs, the one or more workstations, and the one or more servers, and the document management system is configured to:
   a) generate a unique secure mark associated with an original document created by one of the MFDs and workstations;
   b) register in a document registry database the unique secure mark associated with the original document and associating the unique security mark with metadata associated with the original document including a document creator, document creation time, document name and document security protection level;
   c) monitor document activity associated with all or part of the original document by detecting a presence of the unique security mark during a next occurrence of all or part of a content of the original document within an active document associated with the document activity, wherein document activity is activity associated with an image output processing device, including printing the active document, scanning the active document, copying the active document, and faxing the active document;
   d) record in an activity log associated with the document registry database the document activity associated with the active document; and
   e) repeat steps a)-d) for subsequent document activity associated with all or part of the original document.

2. The document processing system according to claim 1, wherein the unique secure mark is printed on an active document printed with an MFD.

3. The document processing system according to claim 1, wherein the document management system is configured to:
   generate and display to a user a complete history of documents processed including all activities associated with the documents.

4. The document processing system according to claim 1, wherein an active document includes content from two or more independent original documents.

5. The document processing system according to claim 1, wherein the secure mark is one of a glyph, image, barcode, Quick Response (QR) code, watermark, and micro-text.

6. The document processing system according to claim 1, wherein the document management system is configured to:
   receive an image of the secure mark from a mobile device and display to the mobile device activity of the associated document.

7. The document processing system according to claim 1, the document management system configured to:
   control a user's ability to perform one or more of printing, scanning, copying and faxing an active document based on access privileges associated with the user which are attributed to the secure mark associated with the active document.

8. The document processing system according to claim 1, wherein the secure mark is printed on the document with an ink having Radio Frequency Identification Device (RFID) capabilities and the document management system is configured to:
   trigger an alarm if the document is in proximity to one or more predetermined areas operatively associated with RFID readers.

9. A document management method associated with a document processing system, the document processing system including one or more multifunction devices (MFDs) configured to perform one or more of document printing, document scanning, document copying and document faxing, the one or more MFDs operatively connected to a network;
   one or more user workstations operatively connected to the network, the one or more user workstations configured to digitally process a content associated with a digital representation of a document;
   one or more servers operatively associated with the one or more MFDs and the one or more user workstations, the one or more servers operatively connected to the network and the one or more servers operatively associated with a document management system, the one or more MFDs, the one or more workstations, and the one or more servers, the method comprising:
   a) generating a unique secure mark associated with an original document created by one of the MFDs and workstations;
   b) registering in a document registry database the unique secure mark associated with the original document and associating the unique security mark with metadata associated with the original document including a document creator, document creation time, document name and document security protection level;
   c) monitoring document activity associated with all or part of the original document by detecting a presence of the unique security mark during a next occurrence of all or part of a content of the original document within an active document associated with the document activity, wherein document activity is activity associated with an image output processing device, including printing including one or more of printing the active document, scanning the active document, copying the active document, faxing the active document and digitally processing a digital representation of the active document;
   d) recording in an activity log associated with the document registry database the document activity associated with the active document; and
   e) repeating steps a)-d) for subsequent document activity associated with all or part of the original document.

10. The document management method according to claim 9, wherein the unique secure mark is printed on an active document printed with an MFD.

11. The document management method according to claim 9, further comprising:
generating and displaying to a user a complete history of document activity recorded in the activity log associated with the original documents.

12. The document management method according to claim 9, wherein an active document includes content from two or more independent original documents.

13. The document management method according to claim 9, wherein the secure mark is one of a glyph, image, barcode, Quick Response (QR) code, watermark and micro-text.

14. The document management method according to claim 9, further comprising:
receiving an image of the secure mark from a mobile device and displaying to the mobile device activity of the associated document.

15. The document management method according to claim 9, further comprising:
controlling a user's ability to perform one or more of printing, scanning, copying and faxing an active document based on access privileges associated with the user which are attributed to the secure mark associated with the active document.

16. The document management method according to claim 9, wherein the secure mark is a printed on the document with an ink having Radio Frequency Identification Device (RFID) capabilities and the method further comprises:
triggering an alarm if the document is in proximity to one or more predetermined areas operatively associated with RFID readers.

17. A document processing system comprising:
one or more multifunction devices (MFDs) configured to perform one or more of document printing, document scanning, document copying and document faxing, the one or more MFDs operatively connected to a network;
one or more user workstations operatively connected to the network, the one or more user workstations configured to digitally process a content associated with a digital representation of a document;
one or more servers operatively associated with the one or more MFDs and the one or more user workstations, the one or more servers operatively connected to the network and the one or more servers operatively associated with a document management system, the one or more MFDs, the one or more workstations, and the one or more servers, and the document management system is configured to:

a) generate a unique secure mark associated with an original document created by one of the MFDs and workstations;
b) register in a document registry database the unique secure mark associated with the original document and associating the unique security mark with metadata associated with the original document including a document creator, document creation time, document name and document security protection level;
c) monitor document activity associated with all or part of the original document by detecting a presence of the unique security mark during a next occurrence of all or part of a content of the original document within an active document associated with the document activity, the document activity including one or more of printing the active document, scanning the active document, copying the active document, faxing the active document and digitally processing a digital representation of the active document;
d) record in an activity log associated with the document registry database the document activity associated with the active document; and
e) repeat steps a)-d) for subsequent document activity associated with all or part of the original document;
control a user's ability to perform one or more of printing, scanning, copying and faxing an active document based on access privileges associated with the user which are attributed to the secure mark associated with the active document; and
printing the unique secure mark on a copy of the original document with an RFID ink, wherein an alarm is triggered if the copy of the original document is in proximity to one or more predetermined areas operatively associated with RFID readers.

18. The document processing system according to claim 17, wherein the document management system is configured to:
generate and display to a user a complete history of documents processed including all activities associated with the documents.

19. The document processing system according to claim 17, wherein the secure mark is one of a glyph, image, barcode, Quick Response (OR) code, watermark, and micro-text.

20. The document processing system according to claim 17, wherein the document management system is configured to:
receive an image of the secure mark from a mobile device and display to the mobile device activity of the associated document.

\* \* \* \* \*